United States Patent [19]

Tsai

[11] Patent Number: 5,968,141
[45] Date of Patent: Oct. 19, 1999

[54] SYSTEM FOR SELECTIVELY UPGRADING FIRMWARE CODE FOR OPTICAL DISK DRIVE VIA ATA/IDE INTERFACE BASED ON HOST SYSTEM PROGRAMMING ENABLE SIGNAL

[75] Inventor: Hsi-Jung Tsai, Hsinchu Hsien, Taiwan

[73] Assignee: Winbond Electronics Corp., Hsinchu, Taiwan

[21] Appl. No.: 08/904,541

[22] Filed: Aug. 4, 1997

[30] Foreign Application Priority Data

Jun. 14, 1997 [TW] Taiwan .................................. 86108241

[51] Int. Cl.$^6$ ...................................................... G06F 13/10
[52] U.S. Cl. .................................. 710/14; 710/8; 710/38; 710/74; 710/104
[58] Field of Search ................................ 395/182.05, 309, 395/712; 711/101, 130; 710/129; 714/7

[56] References Cited

U.S. PATENT DOCUMENTS

| | | | |
|---|---|---|---|
| 5,581,716 | 12/1996 | Park | 395/309 |
| 5,592,640 | 1/1997 | Minoura et al. | 711/101 |
| 5,687,346 | 11/1997 | Shinohara | 711/130 |
| 5,809,224 | 9/1998 | Schultz et al. | 395/182.05 |
| 5,812,857 | 9/1998 | Nelson et al. | 395/712 |

*Primary Examiner*—Thomas C. Lee
*Assistant Examiner*—Chien Yuan
*Attorney, Agent, or Firm*—Rabin & Champagne, P.C.

[57] ABSTRACT

An apparatus and the method for upgrading the firmware code of an optical disk drive via the ATA/IDE interface are disclosed. The optical disk drive has a firmware code memory and a microcontroller that executes the firmware code. A drive decoder decodes to connect the optical disk drive to a host computer system via the ATA/IDE interface. The apparatus includes a programming controller that receives signals from the ATA/IDE interface and performs input/output decode to determine whether the host computer system has requested an upgrade of the firmware or to maintain the optical disk drive in normal operation. A multiplexer has a first input connected to the programming controller, and the second input connected to the microcontroller. The multiplexer selects the first input to the memory device via the multiplexed output for performing a firmware upgrade operation when the host computer system requests a firmware upgrade. The on-site upgrade operation can be performed without access to the inside of the drive unit.

29 Claims, 5 Drawing Sheets

SYSTEM FOR SELECTIVELY UPGRADING FIRMWARE CODE FOR OPTICAL DISK DRIVE VIA ATA/IDE INTERFACE BASED ON HOST SYSTEM PROGRAMMING ENABLE SIGNAL

BACKGROUND OF THE INVENTION

1. Field of the Invention

The invention relates in general to on-site upgrading of firmware code in optical disk drives. In particular, the invention relates to an apparatus for optical disk drives and its corresponding method capable of implementing firmware code upgrade via the ATA/IDE interface of the host computer system.

2. Technical Background

Optical disk drives, in particular the category of CD-ROM drives, the digital optoelectronic memory storage equipment have become so popular that almost every personal computer system has at least one installed. In the world of personal computers, the design of CD-ROM drives was intended originally for the storage of mass information on the CD-ROM discs. The concept, in a sense, is basically the same as the magnetic disk drives, which store information on the surface of the storage media. No writing capability is available to the user for this member of the CD family, and thus the name "CD-ROM." Large data is, however, accessible from CD-ROM discs that are mass produced for a low cost.

Although CD-ROM has been adopted by the ISO as a standard for digital data storage, there are also other applications beyond the simple storage of large amounts of data. Under proper software control, a CD-ROM drive may also be used to access several other types of discs in the CD family.

For example, in personal computer systems, CD-ROM drives are frequently used as the traditional CD player for playing back music pieces stored on the very first generation of CD, namely, the music CD. After the introduction of the original music CD, there had emerged in the family such formats as the Video CD (VCD). Conventional CD-ROM drives for personal computer systems are designed to be able to play back VCD video programs on the computer display screen. Due to the inherent limitation of the MPEG-1 adopted, the VCD standard is not for serious applications, and a couple of groups of electronic appliance conglomerates have recently achieved a new standard known as the Digital Video Disc (or Digital Versatile Disc).

This is a new video data storage format, a new member of the CD family based on the MPEG-2 standard that provides substantially better video effects via the use of higher resolution. As the DVD standard had proposed, backward compatibility for the new generation of DVD drives to the CD-ROM format has been designed into the new system. In other words, the up-coming DVD drives will be able to read CD-ROM in addition to its default DVD.

Thus, as an optical Compact Disc subsystem for a computer system, the CD-ROM drive can be programmed to access different formats of the CD family of media. In the popular x86-based IBM-compatible machines, this is implemented in a manner known as software driver installation. With the installation of the proper software drivers, the computer system, governed by the operating system, can be used to read data files stored on the CD-ROM, playback music CD, or video VCD. These software drivers are essentially established on top of the hardware-level control program resident in the control system of a CD-ROM drive. This firmware program is usually stored in non-volatile semiconductor memory devices, such as the erasable-programmable read-only memory (EPROM) or electrically erasable-programmable read-only memory (EEPROM).

Based on this firmware, CD-ROM drives can be controlled by the host computer system to suitably implement the functionality of music CD player, VCD player, and/or CD-ROM data drive. However, under certain circumstances, in particular when new models of CD-ROM drives are released to market for sale, software programs, either the firmware in the control electronics of the drive itself or the operating system/application-level driver, may have program problems (program bugs) that might cause the drive to malfunction. If the problem was with the operating system/application-level driver, it's fix may not involve the CD-ROM drive at all. If, however, the problem was unfortunately with the firmware of the CD-ROM drive, the software fix will inevitably cause much trouble.

Basically, if the drive firmware has any program problem, the firmware stored in the semiconductor memory device must be upgraded, namely, replaced by another copy without the problem. If the semiconductor memory used for holding the firmware program was a device like an EPROM, it must be removed from its inserted socket or de-soldered from the printed circuit board so as to implement reprogramming of its memory content. Normally, this involves ultraviolet irradiation on the EPROM device for its memory content erasure. If the erased memory device was to be reused again, as is usually the case, it then has to be reprogrammed to hold the new problem-free firmware program. Even if an EEPROM device was used to store the drive firmware, it must be handled in the manner as in the case of EPROM. This is because the conventional CD-ROM drive control logic lacks the design for on-site reprogramming.

The above-described procedure of firmware upgrade/fix for the conventional CD-ROM drives requires that the casing of the drive be opened in order to be able to have access to the firmware memory device. Before the memory device can even be accessed, the CD-ROM drive itself must be removed from the drive bay of the computer system unit, if it has already been installed. Further, erasure and programming of EPROM and/or EEPROM devices normally require the use of dedicated equipment such as ultraviolet eraser and programmer. Therefore, typical firmware upgrade operation for a CD-ROM drive is not normally handled by the end user of the computer system. A more likely scenario would be to have service personnel remove the CD-ROM drive from the system, and have the drive sent back to the manufacturer's site where the firmware gets upgraded.

When the CD-ROM drive whose firmware is to be upgraded is returned to the manufacturer's facility, the casing is opened, and the memory device is removed from the drive electronics utilizing proper tools and/or equipment. After reprogramming, the memory device, or a substitute thereof containing the correct firmware program code, may then be replaced back into the drive electronics. After adequate testing procedures, the upgraded CD-ROM drive is ready to be returned to the owner. Again, qualified personnel must replace the drive back into the computer system. As is obvious, relatively complicated professional knowledge is required to perform all the tasks involved in the upgrade of a CD-ROM drive. In a time when severe competition has driven the prices of CD-ROM drives down to the level where it is difficult for manufacturers to maintain a descent profit margin, such upgrading operation is strictly disastrous.

This is because the necessity to perform firmware upgrade for a CD-ROM drive often arises within the warrantee period of the product. As such, it is convention that the manufacturer will have to be responsible for the expenditures of drive removal from the host computer system as well as shipment, not to mention all the additional man power required to perform the upgrade. On the other hand, in the process of upgrade, the drive and its components may easily be subject to damages to cause additional loss. For the drive owner, the cost to find some technician to remove the drive from the computer system (if the manufacturer was not going to be responsible) may frequently amount to the level of the cost of some low-end CD-ROM drives.

SUMMARY OF THE INVENTION

It is therefore and object of the invention to provide an apparatus and its corresponding method for upgrading firmware code on-site for optical disk drives via the ATA/IDE interface of the host computer system without having to open up the cabinet and remove the drive unit from the computer.

It is another object of the invention to provide an apparatus and its corresponding method for upgrading firmware code on-site for optical disk drives via the ATA/IDE interface of the host computer system by the host processor directly writing into the memory device holding the firmware code.

In order to achieve the above objects, the invention provides an apparatus for upgrading the firmware code of an optical disk drive via the ATA/IDE interface. The optical disk drive has a memory device for storing the firmware code, a microcontroller executing the firmware code for controlling the optical disk content access operation of the drive, and a drive decoder for decoding to connect the optical disk drive to a host computer system via the ATA/IDE interface. The apparatus includes a programming controller that receives signals from the ATA/IDE interface and performs input/output decode for generating a programming enable signal that determines whether the host computer system has requested an upgrade of the firmware or to maintain the optical disk drive in normal operation. A multiplexer has a first and a second input, a multiplexed output and a multiplexing select input, the first input is connected to the programming controller, the second input is connected to the microcontroller, and the multiplexing select input receives the programming enable signal. The multiplexer switches the first input to the memory device via the multiplexed output for performing a firmware upgrade operation when the host computer system requests a firmware upgrade.

To achieve the above objects, the invention further provides a method for upgrading the firmware code of an optical disk drive via the ATA/IDE interface. The optical disk drive has a memory device for storing the firmware code and a microcontroller executing the firmware code for controlling the optical disk content access operation of the drive. The method includes the steps of first having the optical disk drive receive signals from the ATA/IDE interface and perform input/output decode to determine whether the host computer system has requested an upgrade of the firmware or to maintain the optical disk drive in normal operation. Then the optical disk drive connects the ATA/IDE interface to the memory device, allowing for a host computer to perform a firmware upgrade operation by directly writing into the memory device when the host computer system requests a firmware upgrade, and connects the microcontroller to the memory device when the host computer system requests for the normal operation of the optical disk drive.

BRIEF DESCRIPTION OF THE DRAWINGS

Other objects, features, and advantages of the present invention will become apparent by way of the following detailed description of the preferred but non-limiting embodiments. The description is made with reference to the accompanying drawings in which.

DETAILED DESCRIPTION OF THE PREFERRED EMBODIMENTS

Note that although for present-day personal computers, CD-ROM drives constitute the majority of optical disk drives currently in service, however, the term "optical disk drive" referred to in this specification should include other types of optical disk drives such as the emerging DVD drive which also originates from the same CD family.

On the other hand, although there are several interface standards currently adopted by conventional CD-ROM drives for communicating with their host personal computer systems, however, the majority being the ATA/IDE (Intelligent Disk Electronics or Industrial Disk Electronics) standard, or its enhanced version EIDE. Other standards include the SCSI (Small Computer System Interface) and even the parallel port interface. The apparatus for upgrading firmware code for optical disk drive of the invention, however, concentrates on the application to those drives with the ATA/IDE interface.

Figure 1:
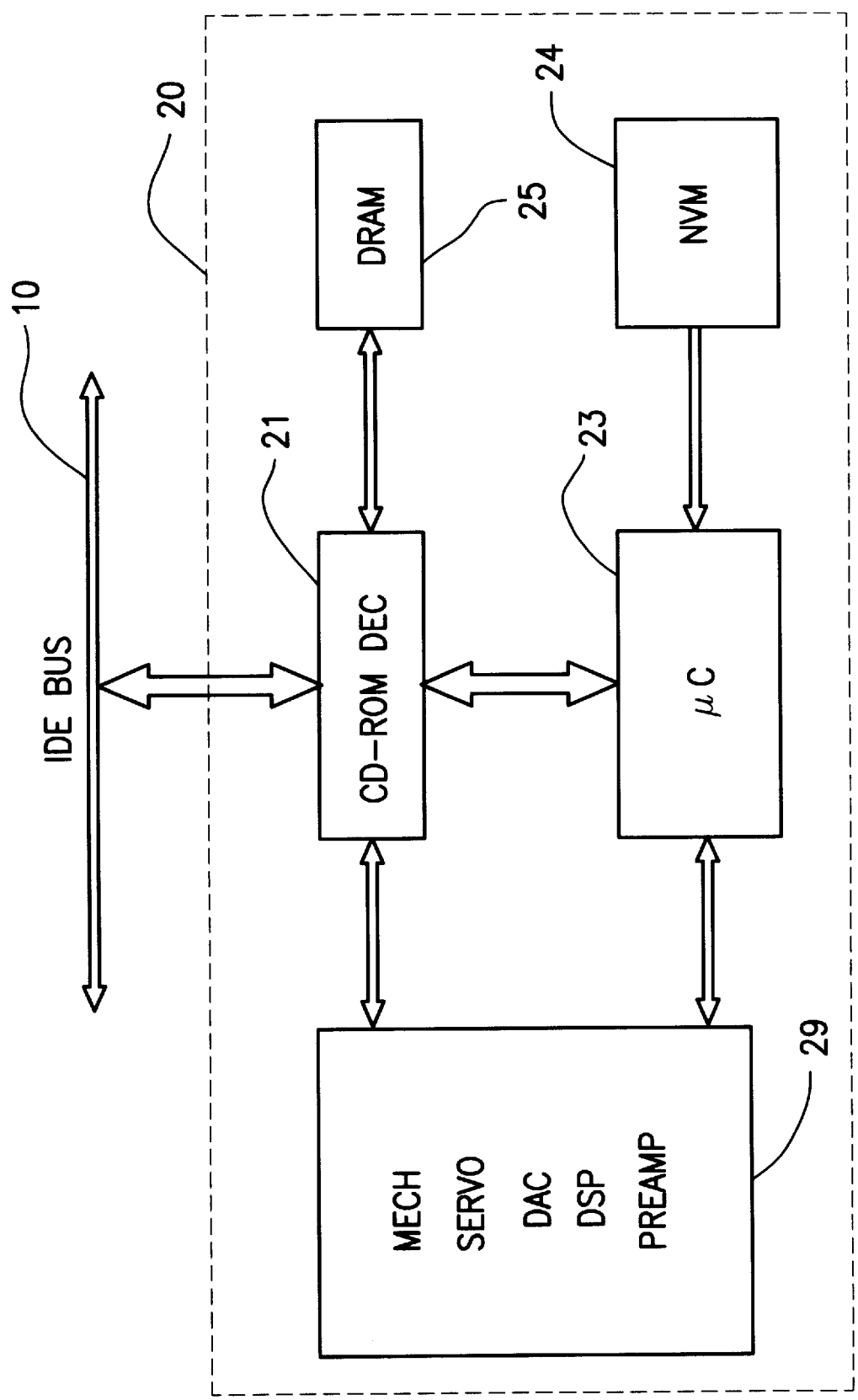
FIG. 1 is a block diagram showing the electronic controller circuitry of a conventional CD-ROM drive.

For the purpose of describing the invention, the general control circuitry configuration for a conventional IDE CD-ROM drive is examined below. As is illustrated in FIG. 1, the conventional CD-ROM drive with ATA/IDE interface has the built-in control electronics generally identified by the reference numeral 20 communicating with the host computer system via the IDE bus 10.

Control circuitry 20 for the typical CD-ROM drives includes a microcontroller ($\mu$C) 23, which is responsible for coordinating the internal operation of the drive. The circuitry 20 further includes a non-volatile memory device (NVM) 24 for the storage of the instruction code and data of the drive firmware program. As is seen in the drawing, the typical CD-ROM drive provides the firmware code to the microcontroller 23 only via read access, as is signified by the single-directional arrow in the drawing. The circuitry 20 has a CD-ROM decoder (CD-ROM DEC) 21, which allows for the interacting operation between the microcontroller 23 and the host computer system via the interface IDE bus 10. A typical circuitry 20 further has a working memory space, which can be provided by, for example, a dynamic random-access memory (DRAM) 25 that serves one important function of read caching as the CD-ROM drive operates.

As persons skilled in the art are well familiar, the control circuitry 20 is further complete with the mechanism servo control (MECH SERVO) for the laser pick-up head, the digital signal processor (DSP) for the accessed CD data, as well as the digital-to-analog converter (DAC) for converting the digital music data into analog signal and the preamplifier (PREAMP) for the amplification of this analog music signal when the CD-ROM is operated as a music CD player. Circuitry of these functional blocks are simply represented by a box 29 in the circuitry 20 as they are not the subject matter of the invention and will not be elaborated here.

Figure 2:
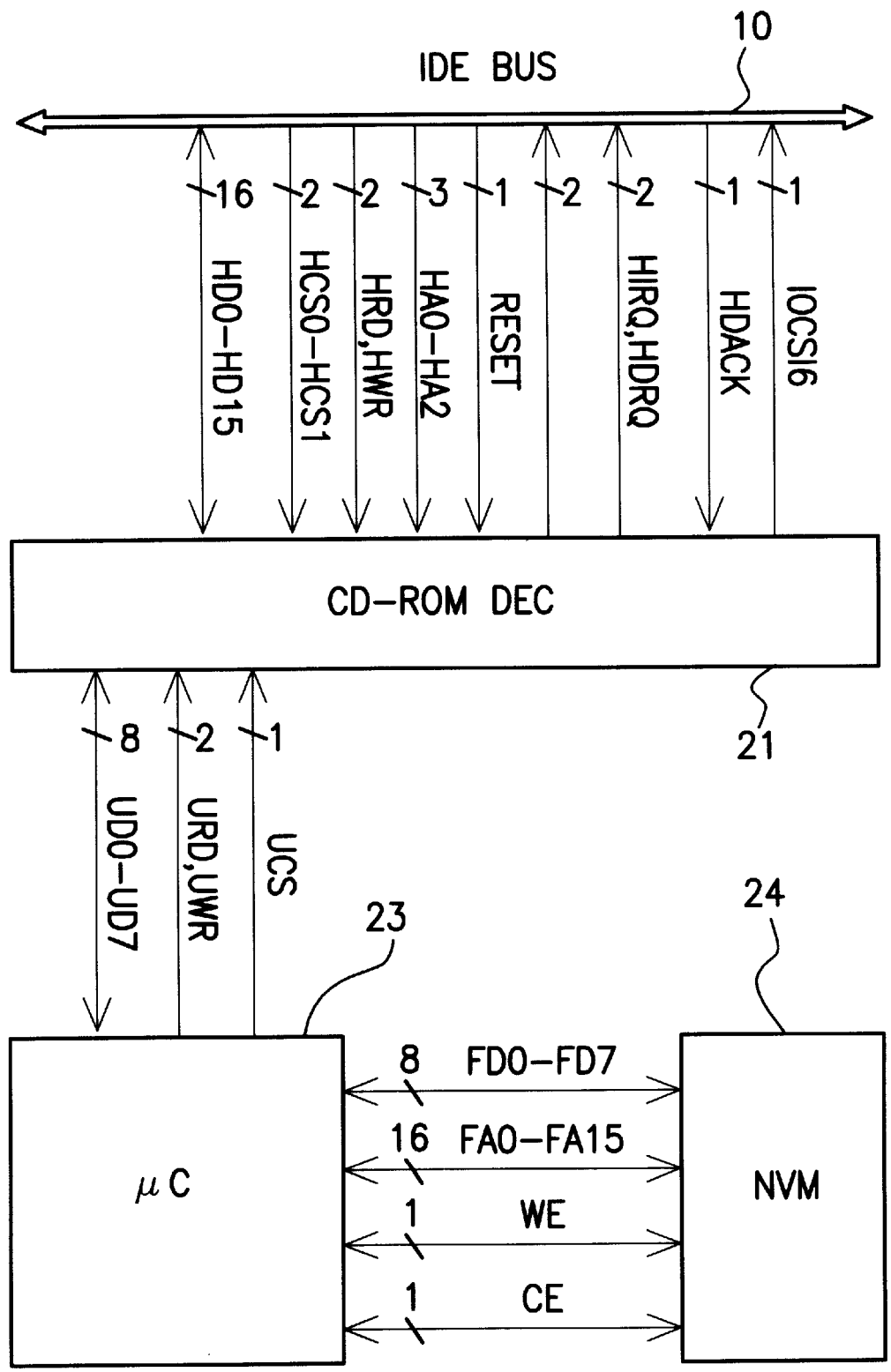
FIG. 2 shows the conventional interface connection between the microcontroller, the firmware memory and the CD-ROM drive decoder with respect to the drive IDE interface that is typical in the CD-ROM drive of FIG. 1.

FIG. 2 shows the details of the inter-connection circuitry between the microcontroller 23 and the CD-ROM decoder 21, as well as the non-volatile memory 24 of an example of a typical IDE CD-ROM drive. As is familiar to persons skilled in the art, the microcontroller 23 of the CD-ROM drive may proceed with its normal data access operation in the drive unit under control of the host computer system. This is done by the host processor executing the CD-ROM driver software and communicating with the drive microcontroller 23 via the set of standard IDE signals in the IDE interface bus 10. This set of bus interface signals include the device addressing signals HA0–2, the input/output port selecting signals HCS0–1, the 16-bit data path HD0–15, as well as other controlling signals including the read/write strobe signal HRD/HWR, the interrupt request/acknowledge signal HIRQ/HDRAQ/HDACK, the reset signal RESET, and the 16-bit I/O transfer status indication signal IOCS16.

Figure 3:
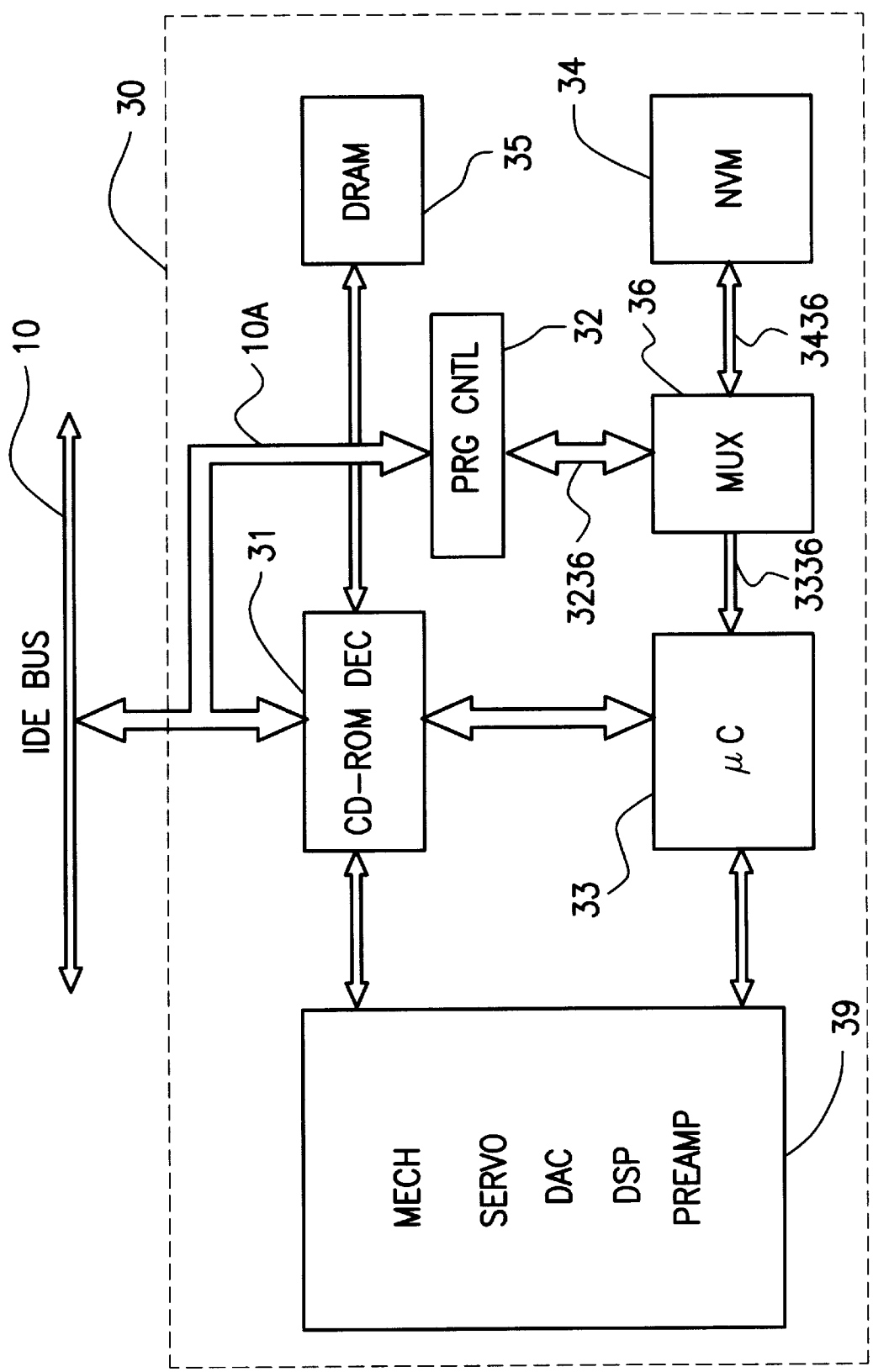
FIG. 3 shows the block diagram of the electronic controller circuitry of the CD-ROM drive employing the apparatus for on-site firmware code upgrade in accordance with a preferred embodiment of the invention.

The apparatus for upgrading firmware code of an optical disk drive via the ATA/IDE interface of the present invention, in one preferred embodiment applicable to a CD-ROM drive, allows for constructing a control circuitry such as the one illustrated in FIG. 3. This is a control circuitry based on the conventional one such as that of FIG. 1.

The basic concept of the inventive apparatus for upgrading firmware code of optical disk drives via the ATA/IDE interface is to decode the instruction issued by the host computer via the ATA/IDE interface. The decoded result determines that either the host computer system desires to maintain the normal CD-ROM drive data access operation, or it demands for an on-site upgrade of the drive firmware code via writing into the code-storage memory. When the host computer system demands an on-site firmware upgrade, the ATA/IDE interface of the CD-ROM drive is then connected to the memory device, so that the host computer may implement the writing of the new code to the memory device. When, on the other hand, the host system requires that the CD-ROM drive unit returns back to normal operating mode, the microcontroller of the drive unit is then re-connected to the memory device, restoring its normal access of program codes in the memory.

In a preferred embodiment, upgrade of the firmware for a CD-ROM drive via the ATA/IDE interface entails inserting a controlled signal multiplexer and its related control logic between the microcontroller and its firmware storage memory device. This multiplexer is used to provide one of two possible data access routes toward the firmware memory device of the drive. One of the routes is established under normal operating condition of the optical disk drive, in which the multiplexer connects the memory device to the microcontroller so that the microcontroller can read firmware program code and data from the memory for execution. Obviously, this mode of memory access operation performed by the microcontroller on the memory device is one-directional, namely, the microcontroller performs read accesses in the memory device only.

The other route that can be established to the firmware code storage memory device is for the memory device itself to be directly accessible by the host computer system when a code upgrade is ordered. In this mode of operation, the multiplexer connects the memory device to the IDE interface of the optical disk drive unit, so that the processor of the host system can directly access the memory space of the firmware memory. This direct access includes both writing into and reading from the memory device. The ability to read from the memory device is necessary as it is a means to verify whether or not the correct content of programming has been achieved.

The on-site upgrading operation referred to herein is defined as the upgrading operation performed in the firmware code storage device of the optical disk drive without having to remove the memory device itself from inside the drive. No dedicated programming tool is needed for the upgrade operation.

Thus, as is illustrated in FIG. 3, the apparatus of the invention for upgrading the firmware code of optical disk drive via the ATA/IDE interface has a multiplexer (MUX) 36 arranged between the microcontroller 33 and the firmware code memory 34 of the drive control electronic circuitry 30. In addition to the decode processing performed by the CD-ROM decoder 31, a programming controller (PRG CNTL) 32 is used to steer the multiplexer 36 for selectively connecting the memory device 34 either to the microcontroller 33 for normal mode of operation or to the IDE bus 10 for connection with the host processor in the firmware upgrade mode of operation. In order to achieve this, as is shown in FIG. 3, the multiplexer 36 is basically a two-to-one multiplexing device, whose details will be covered below.

Therefore, when the programming controller 32 connects the firmware memory device 34 and the microcontroller 33 of the drive, both will be operating in the manner known in the art, with the microcontroller 33 performing a normal operation of accessing firmware program codes from the memory 34, as is in the case of the circuitry configuration of FIG. 1. In other words, as the programming controller 32 connects the memory device 34 to the drive microcontroller 33, the microcontroller 33 may perform its read-only access for the retrieval of its execution code from the memory device 34.

On the other hand, when the programming controller 32 connects the memory device 34 to the IDE bus 10 of the optical disk drive unit, the processor in the host computer system is then allowed to implement its access to the memory device 34. Both write and read accesses to the memory device 34 are allowed for facilitating the on-site firmware code upgrade in a series of read/write operations in the memory device. This is an operation similar to the on-board upgrading of the system BIOS (Basic Input/Output System) code for the IBM-compatible computer systems. In such on-board upgrading operations, the memory device where the BIOS code resides needs not be removed from the motherboard of the computer system, and no dedicated semiconductor memory programmer equipment is required. With the proper setting of a few switches, the code upgrade operation can be completed by the computer system executing a software program.

Figure 4:
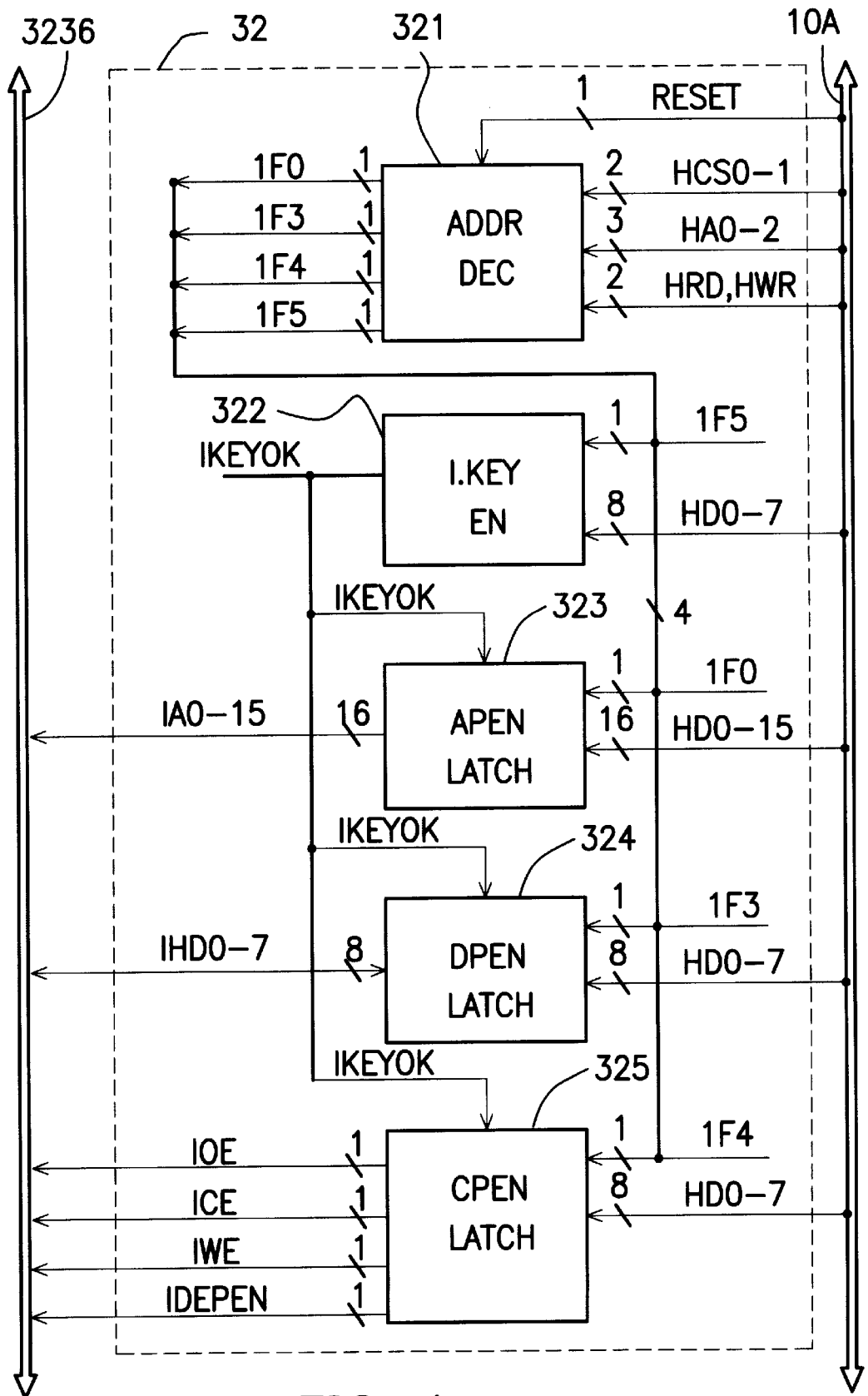
FIG. 4 shows the schematic diagram of the programming controller of the CD-ROM drive embodying the electronic circuit configuration of FIG. 3.

Refer to FIG. 4. FIG. 4 is a schematic diagram that shows an embodiment of the controller circuitry for the CD-ROM drive device employing the apparatus of the invention for implementing on-site upgrade operation of the firmware code. In the circuitry of FIG. 4, control can be performed to selectively connect the memory device 34 either to the microcontroller 33 or to the IDE bus of the drive, in order to perform normal operation or upgrade operation respectively.

From the perspective of the controller, the circuitry of the programming controller 32 as outlined in FIG. 4 allows conversion of the instruction and data issued by the host computer system via the IDE interface 10 into the electrical signals required by the memory device 34 to implement its memory content programming, as the upgrade of firmware code is ordered. Meanwhile, this circuitry of the programming controller 32 also allows for the normal connection of the microcontroller 33 and the memory device 34 as the drive normal operation is required.

In order to accomplish the conversion of the code-upgrading instructions and data, the programming controller 32 as outlined in the circuitry of FIG. 4 includes an I/O address decoder (I/O ADDR DEC) 321, an upgrade initialization key enable logic (INIT KEY EN) 322, an address program enable latch (APEN) 323, a data program enable latch (DPEN) 324, and a control program enable latch (CPEN) 325.

When an on-site upgrade operation is requested, the host computer system must issue a series of corresponding instructions and data into the IDE bus 10 in order for the programming controller 32 to be operating independently from the bus 10 itself. These instructions and data are never present over the IDE bus 10 when the drive is in the normal mode of operation. Instead, they only appear as an on-site upgrading is ordered, and these instructions and data are used to initiate the programming controller 32.

For instance, in a preferred embodiment employed in the case of an IBM-compatible system, the processor of the host system may write a series of 32 consecutive and pre-defined bytes of information at the I/O address 1F5. As is seen in FIG. 4, these data bytes are received over the bus 10A via the I/O address 1F5 as decoded by the I/O address decoder 321. The data received over I/O address 1F5 are then sent to the upgrade initialization key enable logic 322. Note that bus 10A is an extension of the IDE bus 10 that is internal to the controller circuitry 30.

The upgrade initialization key enable logic 322 is triggered by the logically positive signal at the I/O address 1F5 to receive the 32 consecutive information bytes. If these information bytes were compared and found to be compatible with a predetermined set of data, then the upgrade initialization key enable logic 322 generates an upgrade initialization key signal IKEYOK. This signal IKEYOK is then relayed to the address program enable latch 323, the data program enable latch 324, and the control program enable latch 325 respectively. These three latches are then enabled simultaneously inside the controller circuitry 30.

On the other hand, the address program enable latch 323 latches the 16-bit IDE data signals HD0–15 over the bus 10A onto the bus 3236. The counterpart 16-bit data signals on bus 3236 are designated as signals IA0–15. Meanwhile, the data program enable latch 324 also latches the least significant byte (eight bits) of the same 16-bit IDE data signals HD0–15 over the bus 10A onto the bus 3236 as the eight-bit data signals IHD0–7. In a similar manner, the control program enable latch 325 latches the eight least significant bits of the double-byte IDE data signals HD0–15 over the bus 10A onto the bus 3236. Selected ones of the latched bits are used as the write enable signal IWE, the chip enable signal ICE, and the output enable signal IOE, as well as the IDE programming enable signal IDEPEN that are required to strobe the memory device 34 for the implementation of the programming operation.

For example, as the IDE programming enable signal IDEPEN obtains a logically positive status, the processor of the host computer system may then issue the instruction code and data necessary to program the memory device 34. These instructions and data are written into the memory device 34 over the IDE bus 10 at the designated I/O addresses. For example, in the embodiment of FIG. 4, the address of read/write access to the memory device 34 may be issued at the I/O address 1F0 over the IDE interface in data signals HD0–15. On the other hand, I/O address 1F3 and data bits HD0–7 may be used to relay the program code that is to be written into the memory device 34 at the designated address space. Further, I/O address 1F4 and data bits HD0–7 can be used to relay the necessary device strobe signals OE, CE and WE that are required by the memory device 34 when programmed. The programming enable signal IDEPEN, which is used to indicate the status of the entire CD-ROM drive concerning either the drive is in a mode of normal operation or of upgrade programming operation, can itself be relayed also via the I/O address 1F4 as a designated bit in the data by HD0–7.

As persons skilled in the art should be well aware, 16-bit address is sufficient for addressing the firmware memory device normally found in CD-ROM drives. For example, in the case of an eight-bit memory device, 16-bit address relayed via the IA0–15 signal lines are capable of addressing a memory space of 64K bytes. For the consideration of cost reduction, eight-bit memory devices are normally used as the firmware storage device. This is suitable since optical disk drives such as CD-ROM drives are relatively slow peripheral devices when compared to the host processor of modern high-performance personal computer systems. The use of eight-bit data path as relayed via the IHD0–7 signal lines connected to the microcontroller 33 (FIG. 3) is generally adequate design arrangement for the normal CD-ROM drives. Further, all three memory device controlling enable signals IOE, IWE and ICE as well as the programming enable signal IDEPEN may all be obtained via the HD0–7 data bits relayed over the IDE interface bus.

Then, with reference to FIG. 3 again, it can be seen that the circuitry of the programming controller 32 may transfer the 16 address signals IA0–15, the eight data signals IHD0–7, and the four control signals ICE, IOE, IWE and IDEPEN onto bus 3236 at its output end. As these signals are transferred onto bus 3236, they are effectively input to the multiplexer 36, which, depending on the status of the logically positive programming enable signal IDEPEN, may then facilitate the multiplexing operation, in order to selectively connect a set of access signals onto the memory device 34. Under proper timing control, this set of relayed signals may either be used by the microcontroller 33 of the CD-ROM drive itself to operate the drive normally in the CD-ROM data reading sessions, or be used by the processor of the host computer system in the firmware upgrade session. Naturally, the semiconductor memory device 34 used in this case as the firmware storage in the CD-ROM drive must be one that is electrically reprogrammable. It can, for example, be an EEPROM.

The above descriptive paragraphs have concentrated on the operation of the electronics of a CD-ROM drive constructed in accordance with the teachings of the invention as it undergoes a firmware code upgrade operation in the memory device. On the other hand, it should be noted that, under normal situations, firmware code upgrade is a rare operation that can be expected less than several times in the lifetime of a CD-ROM drive. For most of the times, the CD-ROM drive will be reading the memory contents of the CD-ROMs inserted into the drive. In this case, the programming enable signal IDEPEN in the programming controller 32 of FIG. 4 maintains the connection of the memory device 34 substantially direct to the microcontroller 33, so that the microcontroller 33 may execute the code in the memory device 34 to implement the CD-ROM drive functionality. In this sense, a CD-ROM drive employing the apparatus of the invention is substantially the same as the conventional drives.

Figure 5:
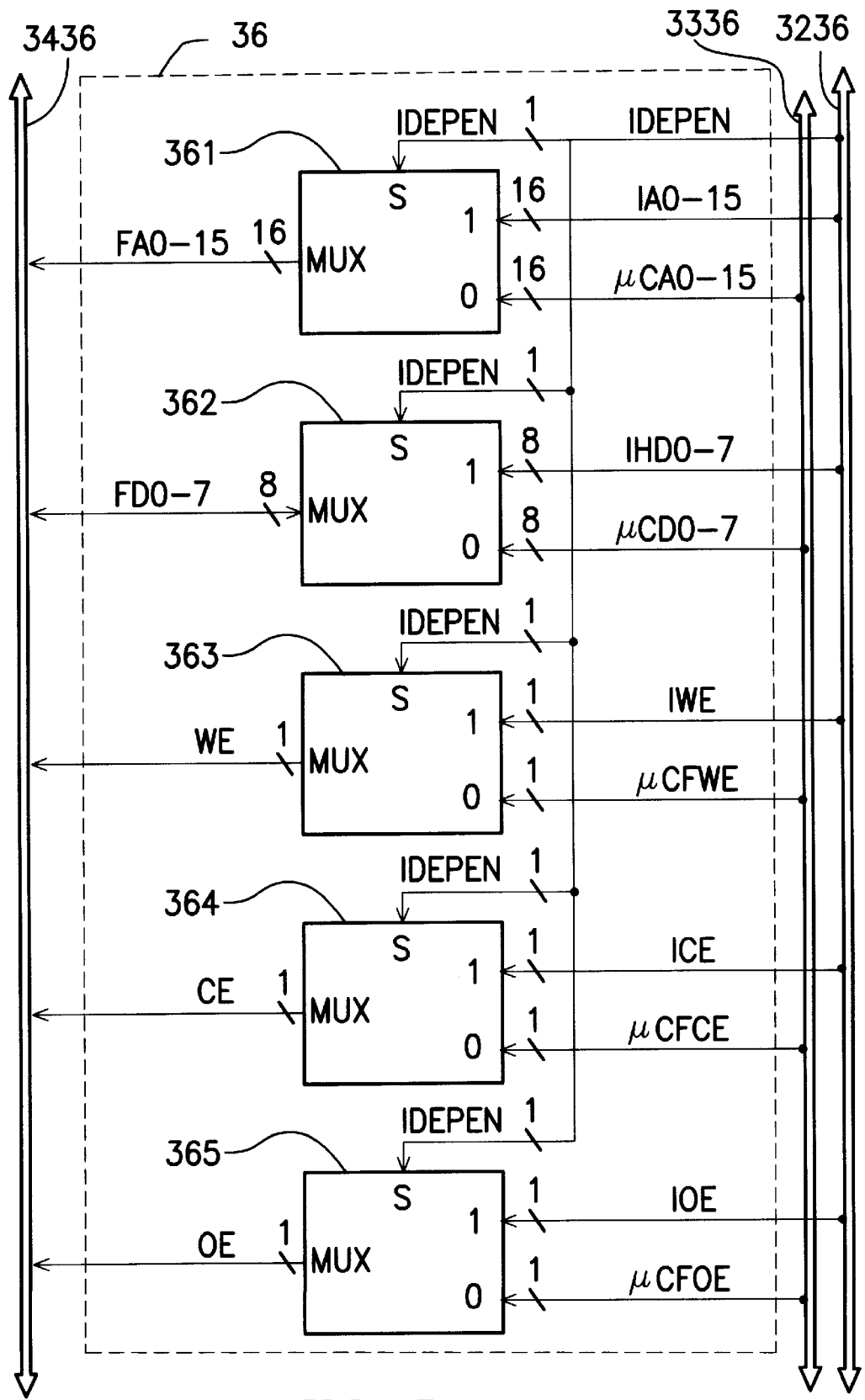
FIG. 5 shows the schematic diagram of the multiplexer of CD-ROM drive embodying the electronic circuit configuration of FIG. 3.

Thus, as is illustrated in the block diagram of FIG. 3, the host computer system can implement its firmware-upgrade code-writing operation against the memory device directly via the standard IDE bus 10. The programming operation is executed by the host computer issuing instruction and related data via the bus 10A, and then via bus 3236 under control of the programming controller 32. The updated code is then sent over the memory device 34 via the bus 3436 as switched by the multiplexer 36. FIG. 5 details the circuitry configuration and the operation of a preferred embodiment of the multiplexer 36.

As is illustrated in FIG. 5, the multiplexer 36 that is employed in the block diagram of FIG. 3 has a group of five two-to-one multiplexer units 361, 362, 363, 364 and 365. All five multiplexer units can be switched by the same control signal. In the case of the embodiment outlined in FIGS. 3 and 4, the programming enable signal IDEPEN is used as the control signal. All the five multiplexer units has their respective first set of input tied to bus 3336 and then to the microcontroller 33 of the CD-ROM drive. The second set of input of the five multiplexer units are tied to bus 3236 and then to the IDE bus 10 via connection through the programming controller 32. The multiplexed output of the five multiplexer units are tied to bus 3436 and thus to the memory device 34. As is clearly outlined in the block diagram of FIG. 3, this bus connection arrangement allows the programming enable signal IDEPEN to facilitate the control of the memory device 34, which is to be selectively connected either to the microcontroller 33 for normal operation and to the drive IDE bus 10 for firmware upgrade operation.

Note that the multiplexer unit 361 has a switched signal path width of 16 bits to accommodate the need to relay the 16-bit IA0–15 signals that provide the address bits during the programming operation of the memory device 34. When the CD-ROM drive is operated normally, this 16-bit signal path width allows the connection of the 16-bit microcontroller address bits $\mu$CA0–15 to be relayed to the 16 address bits FA0–15 of the memory device 34. In a similar manner, the multiplexer unit 362 has an eight-bit width of switched signal path so as to accommodate the need to relay the two sets of data lines IHD0–7 and $\mu$CD0–7 onto the corresponding eight-bit data bus FD0–7 of the memory device 34. By contrast, the multiplexer units 363, 364 and 365 are single-line multiplexing circuits that can be used to relay the WE, CE and OE control signals of the memory device 34.

Thus, with the ATA/IDE interface, a CD-ROM drive employing the apparatus for on-site firmware code upgrade may be operated in one of two operation modes as the need arises. In the normal mode of operation, the firmware code memory device and the microcontroller of the CD-ROM drive can be connected together in order that the code in the memory can be accessed by the microcontroller to conduct normal CD-ROM operation. On the other hand, when the CD-ROM drive is put in the firmware upgrade mode, the memory device can be tied to the IDE interface of the drive, allowing the processor of the host computer to write directly into the addressed memory space of the memory device via the computer system bus that is tied to the IDE bus. The programming instruction code and the new code contents can be relayed to the memory device via the IDE interface equipped in the CD-ROM drive device.

With this direct on-site programming capability, the CD-ROM drive employing the circuitry apparatus of the invention may enjoy the great convenience of firmware code on-site upgrade operation. The drive itself need not be removed from inside the computer system cabinet. The entire code-upgrading operation can be conducted fully via software control. With proper information provided, even the general end user may be able to conduct the upgrade operation by following detailed instructions shown, for example, on the display screen of the computer system. For the CD-ROM drive manufacturers, since both the upgrade software as well as the new version of the firmware program code may be made available to any requesting user via regular or electronic mail services, or via file transfer services in the public networks such as the Internet. Effective conservation of costs in both resource and time for both the manufacturer and the end user can be expected.

Further, since the apparatus for implementing on-site firmware code upgrade via the ATA/IDE interface for CD-ROM drives are relatively simple in the nature of the digital electronic circuitry employed, they can thus be integrated easily in the ASIC chipset of the drive circuitry. In fact, as is appreciable for persons skilled in the art, the inventive apparatus may, for example, be integrated in the CD-ROM decoder 31 of FIG. 3, or even in the microcontroller itself.

While the invention has been described by way of example and in terms of preferred embodiment, it is to be understood that the invention need not be limited to the disclosed embodiments. To the contrary, it is intended to cover various modifications and similar arrangements included within the spirit of the appended claims, the scope of which should be accorded the broadest interpretation so as to encompass all such modifications and similar structures.

What is claimed is:

1. An apparatus for upgrading firmware code of an optical disk drive via an ATA/IDE interface, the optical disk drive comprises a memory device for storing the firmware code, a microcontroller for executing the firmware code to control a content access operation of the optical disk drive, and a drive decoder for decoding ATA/IDE signals to provide communications between the optical disk drive and a host computer system via the ATA/IDE interface, the apparatus comprising:

programming controller means, receiving only the ATA/IDE signals from the ATA/IDE interface, performing input/output decoding on the ATA/IDE signals to determine whether the host computer system has requested an upgrade of the firmware code, or has requested to maintain the optical disk drive in normal operation, and generating a programming enable signal that corresponds to the host computer system request; and multiplexer means, having a first input connected to the programming controller means, a second input for connection to the microcontroller, a multiplexed output for connection to the memory device, and a multiplexing select input for receiving the programming enable signal, wherein the multiplexer means selectively connects the memory device to the programming controller means via the first input and the multiplexed output for performing a firmware code upgrade operation when the programming enable signal constitutes a request for a firmware code upgrade by the host computer system.

2. The apparatus for upgrading firmware code of an optical disk drive via an ATA/IDE interface of claim 1, wherein the programming controller means comprises:

an input/output decoder, receiving a first set of ATA/IDE signals from the ATA/IDE interface and performing the input/output decoding, generating the programming enable signal and further generating a first, a second, a third and a fourth enable signal;

an initialization key enable logic, receiving the first enable signal and a second set of ATA/IDE signals from the ATA/IDE interface and generating an upgrade initialization key signal when the host system requests a firmware code upgrade;

an address program enable latch, receiving the upgrade initialization key signal, the second enable signal, and a third set of ATA/IDE signals from the ATA/IDE interface, latching the third set of signals on the ATA/IDE interface, and generating written address signals for the memory device when the host computer system requests a firmware code upgrade;

a data program enable latch, receiving the upgrade initialization key signal, the third enable signal, and a fourth set of ATA/IDE signals from the ATA/IDE interface, latching the fourth set of signals on the ATA/IDE interface, and generating written data signals for the memory device when the host computer system requests a firmware code upgrade; and a control program enable latch, receiving the upgrade initialization key signal, the fourth enable signal, and a fifth set of ATA/IDE signals from the ATA/IDE interface, latching the fifth set of signals on the ATA/IDE interface, and generating writing control signals for the memory device when the host computer system requests a firmware code upgrade.

3. The apparatus for upgrading firmware code of an optical disk drive via an ATA/IDE interface of claim 2, wherein the third set of ATA/IDE signals received by the address program enable latch from the ATA/IDE interface when the host computer system requests a firmware code upgrade comprises all 16-bit address signals of the ATA/IDE interface.

4. The apparatus for upgrading firmware code of an optical disk drive via an ATA/IDE interface of claim 2, wherein the fourth set of ATA/IDE signals received by the data program enable latch from the ATA/IDE interface when the host computer system requests a firmware code upgrade comprises at least eight bits of data that are least significant.

5. The apparatus for upgrading firmware code of an optical disk drive via an ATA/IDE interface of claim 2, wherein the fifth set of ATA/IDE signals received by the control program enable latch from the ATA/IDE interface when the host computer system requests a firmware code upgrade comprises at least eight bits of data that are least significant.

6. The apparatus for upgrading firmware code of an optical disk drive via an ATA/IDE interface of claim 2, wherein the optical disk drive is a CD-ROM drive.

7. The apparatus for upgrading firmware code of an optical disk drive via an ATA/IDE interface of claim 2, wherein the optical disk drive is a DVD drive.

8. An apparatus for upgrading firmware code of an optical disk drive via an ATA/IDE interface, the optical disk drive comprises a memory device for storing the firmware code, a microcontroller for executing the firmware code to control a content access operation of the optical disk drive, and a drive decoder for decoding ATA/IDE signals to provide communications between the optical disk drive and a host computer system via the ATA/IDE interface, the apparatus comprising:

programming controller means, receiving only the ATA/IDE signals from the ATA/IDE interface, performing input/output decoding on the ATA/IDE signals to determine whether the host computer system has requested an upgrade of the firmware code, or has requested to maintain the optical disk drive in normal operation, and generating a programming enable signal that corresponds to the host computer system request, the programming controller means includes:

an input/output decoder, receiving a first set of ATA/IDE signals from the ATA/IDE interface and performing the input/output decoding, generating the programming enable signal and further generating a first, a second, a third and a fourth enable signal;

an initialization key enable logic, receiving the first enable signal and a second set of ATA/IDE signals from the ATA/IDE interface and generating an upgrade initialization key signal when the host system requests a firmware code upgrade;

an address program enable latch, receiving the upgrade initialization key signal, the second enable signal, and a third set of ATA/IDE signals from the ATA/IDE interface, latching the third set of signals on the ATA/IDE interface, and generating written address signals for the memory device when the host computer system requests a firmware code upgrade;

a data program enable latch, receiving the upgrade initialization key signal, the third enable signal, and a fourth set of ATA/IDE signals from the ATA/IDE interface, latching the fourth set of signals on the ATA/IDE interface, and generating written data signals for the memory device when the host computer system requests a firmware code upgrade; and a control program enable latch, receiving the upgrade initialization key signal, the fourth enable signal, and a fifth set of ATA/IDE signals from the ATA/IDE interface, latching the fifth set of signals on the ATA/IDE interface, and generating writing control signals for the memory device when the host computer system requests a firmware code upgrade; and multiplexer means, having a first input connected to the programming controller means, a second input for connection to the microcontroller, a multiplexed output for connection to the memory device, and a multiplexing select input for receiving the programming enable signal, wherein the multiplexer means selectively connects the memory device to the programming controller means via the first input and the multiplexed output for performing a firmware code upgrade operation when the programming enable signal constitutes a request for a firmware code upgrade by the host computer system.

9. The apparatus for upgrading firmware code of an optical disk drive via an ATA/IDE interface of claim 8, wherein the third set of ATA/IDE signals received by the address program enable latch from the ATA/IDE interface when the host computer system requests a firmware code upgrade comprises all 16-bit address signals of the ATA/IDE interface.

10. The apparatus for upgrading firmware code of an optical disk drive via an ATA/IDE interface of claim 8, wherein the fourth set of ATA/IDE signals received by the data program enable latch from the ATA/IDE interface when the host computer system requests a firmware code upgrade comprises at least eight bits of data that are least significant.

11. The apparatus for upgrading firmware code of an optical disk drive via an ATA/IDE interface of claim 8, wherein the fifth set of ATA/IDE signals received by the control program enable latch from the ATA/IDE interface when the host computer system requests a firmware code upgrade comprises at least eight bits of data that are least significant.

12. The apparatus for upgrading firmware code of an optical disk drive via an ATA/IDE interface of claim 8, wherein the optical disk drive is a CD-ROM drive.

13. The apparatus for upgrading firmware code of an optical disk drive via an ATA/IDE interface of claim 8, wherein the optical disk drive is a DVD drive.

14. A method for upgrading firmware code of an optical disk drive via an ATA/IDE interface, the optical disk drive comprises a memory device for storing the firmware code and a microcontroller for executing the firmware code to control a content access operation of the optical disk drive; the method comprising:

receiving ATA/IDE signals from the ATA/IDE interface;

performing input/output decoding on the ATA/IDE signals to determine whether a host computer system has requested an upgrade of the firmware code or has requested to maintain the optical disk drive in normal operation;

connecting the ATA/IDE interface to the memory device and allowing the host computer to perform a firmware code upgrade operation by directly writing into the memory device when the host computer system requests a firmware code upgrade; and connecting the microcontroller to the memory device when the host computer system requests to maintain normal operation of the optical disk drive.

15. The method for upgrading firmware code of an optical disk drive via an ATA/IDE interface of claim 14, wherein the optical disk drive is a CD-ROM drive.

16. The method for upgrading firmware code of an optical disk drive via an ATA/IDE interface of claim 14, wherein the optical disk drive is a DVD drive.

17. A method for upgrading firmware code of an optical disk drive via an ATA/IDE interface; wherein the optical disk drive comprises a memory device for storing the firmware code; wherein a microcontroller executes the firmware code for controlling a content access operation of the optical disk drive; wherein a drive decoder for decoding ATA/IDE signals provides communications between the optical disk drive and a host computer system via the ATA/IDE interface; wherein a multiplexer means has a first input connected to a programming controller means, a second input connectable to the microcontroller, a multiplexed output, and a multiplexing select input; and wherein the programming controller means selectively switches the multiplexing of the multiplexer means, the method comprising:

receiving only the ATA/IDE signals from the ATA/IDE interface at the programming controller means;

performing input/output decoding on the ATA/IDE signals to determine whether the host computer system has requested an upgrade of the firmware code or has requested maintenance of the optical disk drive in normal operation;

generating a programming enable signal that corresponds to the host computer system request; and receiving the programming enable signal at the multiplexing select input for selectively connecting the memory device and the programming controller means via the first input and the multiplexed output for performing a firmware code upgrade operation when the programming enable signal constitutes a request for a firmware code upgrade by the host computer system.

18. The method for upgrading the firmware code of an optical disk drive via the ATA/IDE interface of claim 17, wherein the generating the programming enable signal includes:

an input/output decoder of the programming controller means
receiving a first set of ATA/IDE signals from the ATA/IDE interface,
performing the input/output decoding on the received first set of signals,
generating the programming enable signal, and
generating a first, a second, a third and a fourth enable signal;

an initialization key enable logic of the programming controller means
receiving the first enable signal and a second set of ATA/IDE signals from the ATA/IDE interface, and
generating an upgrade initialization key signal when the host system requests a firmware upgrade;

an address program enable latch of the programming controller means
receiving the upgrade initialization key signal, the second enable signal, and a third set of ATA/IDE signals from the ATA/IDE interface,
latching the third set of signals on the ATA/IDE interface, and
generating written address signals for the memory device when the host computer system requests a firmware upgrade;

a data program enable latch of the programming controller means
receiving the upgrade initialization key signal, the third enable signal, and a fourth set of ATA/IDE signals from the ATA/IDE interface,
latching the fourth set of signals on the ATA/IDE interface, and
generating written data signals for the memory device when the host computer system requests a firmware code upgrade; and a control program enable latch of the programming controller means
receiving the upgrade initialization key signal, the fourth enable signal, and a fifth set of ATA/IDE signals from the ATA/IDE interface,
latching the fifth set of signals on the ATA/IDE interface, and
generating writing control signals for the memory device when the host computer system requests a firmware code upgrade.

19. The method for upgrading firmware code of an optical disk drive via an ATA/IDE interface of claim 18, wherein the third set of ATA/IDE signals received by the address program enable latch from the ATA/IDE interface when the host computer system requests a firmware code upgrade comprises all 16-bit address signals of the ATA/IDE interface.

20. The method for upgrading firmware code of an optical disk drive via an ATA/IDE interface of claim 18, wherein the fourth set of ATA/IDE signals received by the data program enable latch from the ATA/IDE interface when the host computer system requests a firmware code upgrade comprises at least eight bits of data that are least significant.

21. The method for upgrading firmware code of an optical disk drive via an ATA/IDE interface of claim 18, wherein the fifth set of ATA/IDE signals received by the control program enable latch from the ATA/IDE interface when the host computer system requests a firmware code upgrade comprises at least eight bits of data that are least significant.

22. The method for upgrading firmware code of an optical disk drive via an ATA/IDE interface of claim 18, wherein the optical disk drive is a CD-ROM drive.

23. The method for upgrading firmware code of an optical disk drive via an ATA/IDE interface of claim 18, wherein the optical disk drive is a DVD drive.

24. A method for upgrading firmware code of an optical disk drive via an ATA/IDE interface; wherein the optical disk drive comprises a memory device for storing the firmware code; wherein a microcontroller executes the firmware code for controlling a content access operation of the optical disk drive; wherein a drive decoder for decoding ATA/IDE signals provides communications between the optical disk drive and a host computer system via the ATA/IDE interface; wherein a multiplexer means has a first input connected to a programming controller means, a second input connectable to the microcontroller, a multiplexed output, and a multiplexed select input; and wherein the programming controller means selectively switches the multiplexing of the multiplexer means, the method comprising:

receiving only the ATA/IDE signals from the ATA/IDE interface at the programming controller means;

performing input/output decoding on the ATA/IDE signals to determine whether the host computer system has requested an upgrade of the firmware code or has requested maintenance of the optical disk drive in normal operation, generating a programming enable signal that corresponds to the host computer system request, the generation of the programming enable signal including:

an input/output decoder of the programming controller means
receiving a first set of ATA/IDE signals from the ATA/IDE interface,
performing the input/output decoding on the received first set of signals,
generating the programming enable signal, and
generating a first, a second, a third and a fourth enable signal;

an initialization key enable logic of the programming controller means
receiving the first enable signal and a second set of ATA/IDE signals from the ATA/IDE interface, and
generating an upgrade initialization key signal when the host system requests a firmware code upgrade;

an address program enable latch of the programming controller means
receiving the upgrade initialization key signal, the second enable signal, and a third set of ATA/IDE signals from the ATA/IDE interface,
latching the third set of signals on the ATA/IDE interface, and
generating written address signals for the memory device when the host computer system requests a firmware code upgrade;

a data program enable latch of the programming controller means
receiving the upgrade initialization key signal, the third enable signal, and a fourth set of ATA/IDE signals from the ATA/IDE interface,
latching the fourth set of signals on the ATA/IDE interface, and
generating written data signals for the memory device when the host computer system requests a firmware code upgrade; and a control program enable latch of the programming controller means
receiving the upgrade initialization key signal, the fourth enable signal, and a fifth set of ATA/IDE signals from the ATA/IDE interface,
latching the fifth set of signals on the ATA/IDE interface, and generating writing control signals for the memory device when the host computer system requests a firmware code upgrade; and receiving the programming enable signal at the multiplexing select input for selectively connecting the memory device and the programming controller means via the first input and the multiplexed output for performing a firmware upgrade operation when the programming enable signal constitutes a request for a firmware code upgrade by the host computer system.

25. The method for upgrading firmware code of an optical disk drive via an ATA/IDE interface of claim 24, wherein the third set of ATA/IDE signals received by the address program enable latch from the ATA/IDE interface when the host computer system requests a firmware code upgrade comprises all 16-bit address signals of the ATA/IDE interface.

26. The method for upgrading firmware code of an optical disk drive via an ATA/IDE interface of claim 24, wherein the fourth set of ATA/IDE signals received by the data program enable latch from the ATA/IDE interface when the host computer system requests a firmware code upgrade comprises at least eight bits of data that are least significant.

27. The method for upgrading firmware code of an optical disk drive via an ATA/IDE interface of claim 24, wherein the fifth set of ATA/IDE signals received by the control program enable latch from the ATA/IDE interface when the host computer system requests a firmware code upgrade comprises at least eight bits of data that are least significant.

28. The method for upgrading firmware code of an optical disk drive via an ATA/IDE interface of claim 24, wherein the optical disk drive is a CD-ROM drive.

29. The method for upgrading firmware code of an optical disk drive via an ATA/IDE interface of claim 24, wherein the optical disk drive is a DVD drive.

* * * * *